United States Patent [19]
Aspers et al.

[11] 3,965,778
[45] June 29, 1976

[54] MULTI-STAGE TIGHTENING SYSTEM

[75] Inventors: Arthur J. Aspers, Mount Ephriam, N.J.; Robert J. Finkelston, Hatboro, Pa.

[73] Assignee: Standard Pressed Steel Co., Jenkintown, Pa.

[22] Filed: Sept. 19, 1974

[21] Appl. No.: 507,544

[52] U.S. Cl. .............................. 81/52.4 R; 173/12
[51] Int. Cl.² ..................................... B25B 23/142
[58] Field of Search ........ 81/52.4 R, 52.4 B, 57.11, 81/57.14, 57.22, 57.36; 173/12

[56] References Cited
UNITED STATES PATENTS

| | | | |
|---|---|---|---|
| 2,691,314 | 10/1954 | Stevens et al. | 81/57.22 |
| 2,720,803 | 10/1955 | Rice et al. | 81/57.22 |
| 2,781,682 | 2/1957 | Herndon | 81/57.22 X |
| 2,796,789 | 6/1957 | Rice et al. | 81/57.22 |
| 3,180,612 | 4/1965 | Spyridakis | 173/12 X |
| 3,319,494 | 5/1967 | Ulbing | 81/52.4 |

*Primary Examiner*—James L. Jones, Jr.
*Attorney, Agent, or Firm*—Andrew L. Ney; Robert P. Seitter; Aaron Nerenberg

[57] ABSTRACT

A sequential tightening system is disclosed in this application for tightening a plurality of fasteners to a final predetermined condition and includes a plurality of wrenches for tightening the fasteners and a control system operatively associated with each of said wrenches for tightening the fasteners to a first predetermined condition, preferably their seated condition and at a relatively high output speed of the wrenches, and temporarily discontinuing the tightening procedure. When the tightening procedure of all of the wrenches has been temporarily discontinued, the control means restarts the tightening procedure of each wrench simultaneously or, if desired, sequentially, and, preferably at a lower output speed of the wrenches. As each wrench tightens its operatively engaged fastener to the final predetermined condition, the control means discontinues the tightening procedure of that wrench.

25 Claims, 3 Drawing Figures

MULTI-STAGE TIGHTENING SYSTEM

This invention relates to tightening systems for tightening fasteners to a final predetermined condition and, more particularly, to tightening systems for tightening fasteners to a final predetermined condition in stages.

Various joint assemblies are tightened by a plurality of fasteners which should be tightened in a predetermined order, usually simultaneously, but sometimes sequentially to provide for the maximum integrity of the joint. Accordingly, in tightening joints of this type it is usual to provide a multiple spindle tightening system, that is, a tightening system including a plurality of wrenches mounted together on a gang plate or other common frame in a predetermined pattern such that the wrenches can be simultaneously engaged with all of the fasteners in the joint assembly. When the joint assemblies of this type require a precise control such that they are all tightened to a predetermined condition, it is usual to provide a multi-stage tightening system operative to initially tighten the fasteners at a relatively high speed to a first predetermined condition and then tighten to the final predetermined condition at a slower speed. By utilizing multi-stage tightening systems the first predetermined condition can represent the seating of the fasteners so that all of the fasteners are seated during the first stage and then actually tightened to the final predetermined condition in the second stage. If the fasteners are tightened simultaneously from the seated condition, they will be tightened to the final predetermined condition at about the same time. Accordingly, the problems caused by the first fastener tightened to the final predetermined condition relaxing while the other fasteners are still being tightened is obviated. In addition, utilization of this technique allows a slower output speed to be used in the second stages whereby the accuracy of the system is improved.

Multiple unit tightening systems of the type providing for a two-stage tightening cycle are known in the art and generally provide a relatively high speed tightening stage until a predetermined torque approximately the point wherein the fasteners are seated is achieved. As each fastener is seated the wrench with which it is being tightened is temporarily stopped and when all of the fasteners have been tightened to the predetermined torque, the second stage of the cycle commences. Certain of these known systems rely on torque measurement to provide a stop signal at the seated condition of the fastener and all of the wrenches in the system are temporarily stopped except for the wrench tightening the last fastener to be tightened to its seated condition. When the last fastener to be tightened to its seated condition reaches that condition a signal is developed to commence the second stage but the wrench engaged with that fastener is not stopped and a lag time is provided between the wrench and the other wrenches in the system. Accordingly, with systems of this type, all of the advantages of multi-stage tightening are not obtained.

Accordingly, it is an object of this invenntion to provide a multi-stage tightening system that assures that all of the tightening apparatus in the system have temporarily stopped between the stages of the tightening cycle.

It is another object of this invention to provide a multi-stage tightening system that assures that all of the tightening apparatus in the system have seated their engaged fasteners before proceeding to the next stage in the tightening cycle.

It is yet another object of this invention to provide a multi-stge tightening system which may be programmed to allow the tightening apparatus to commence a latter stage of the tightening cycle either simultaneously or sequentially.

Finally, it is an object of this invention to provide a multi-stage tightening system that is relatively accurate, reliable and economical.

These and other objects of this invention are accomplished by providing a multi-stage tightening system including a plurality of wrenches each adapted to tighten a fastener and apparatus for discontinuing the output of each of the wrenches when said fasteners have been tightened to an initial predetermined condition. Operatively associated with the wrenches is a control system for shutting off each of the wrenches when the fasteners have been tightened to a final predetermined condition. Further associated with the wrenches is an interface system for determining when all of the wrenches have discontinued their output and for, thereafter, reactivating said wrenches whereby the control system can function to shut off the wrenches at the final predetermined condition of the fasteners.

More specifically, the apparatus for discontinuing the output of the wrenches can conveniently include a gear arrangement connected between the motor and the drive shaft which is arranged to stall at a predetermined torque corresponding to the seating torque of the fasteners and the interface system can conveniently include a suitable arrangement responsive to signals representative of rotation of the wrenches for determining that the rotational output of all of the wrenches has been discontinued and for thereafter developing a signal operative to change the gearing between the motor and the drive shaft such that the tightening cycle can continue. In certain embodiments of the invention the interface system can include an arrangement for determining that each of the wrenches has provided an initial output to assure that the wrenches have operated thus assuring that the signals indicating that the wrenches have discontinued their rotational output have not been developed because a wrench has malfunctioned.

For a better understanding of the invention, reference is made to the following description of a preferred embodiment taken in conjunction with the figures of the accompanying drawing, in which.

Figure 3:
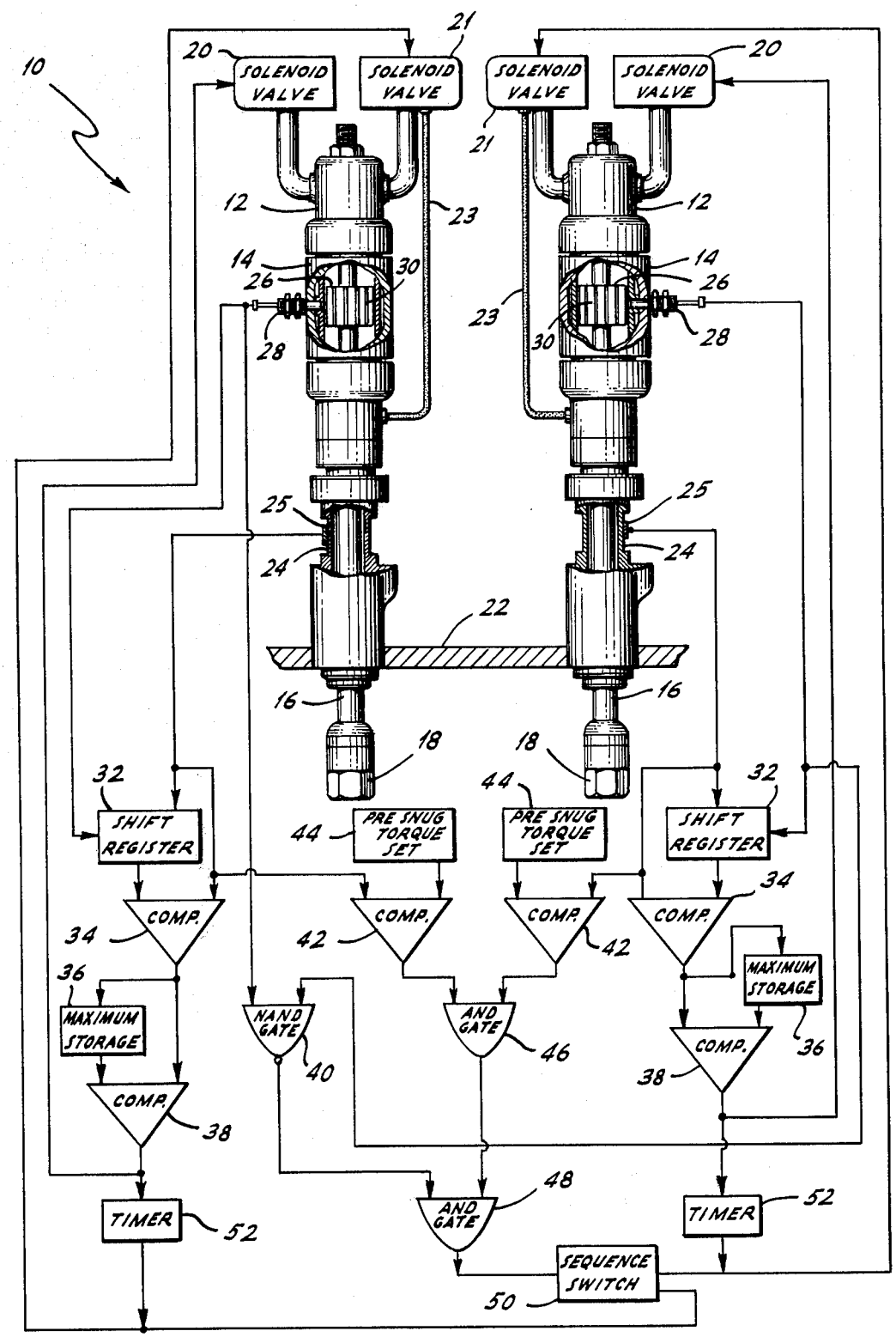

Referring now to FIG. 3 of the drawing, there is illustrated a tightening system 10 in accordance with this invention. Tightening system 10 includes a plurality of wrenches 12, 12 each having a motor 14, an output drive shaft 16 and drive bit 18. Only two wrenches are illustrated herein, but it should be understood that any suitable number could be utilized in a system in accordance with this invention. Each drive shaft 16 is driven by its associated motor 14 to apply torque and impart rotation to a fastener member engaged by its associated driver bit 18. Each wrench 12 is of the type having a capability of providing two output speeds for its drive shaft 16 and, accordingly, the fastener being tightened. Preferably both wrenches 12, 12 may be of the type disclosed in U.S. Pat. No. 3,610,343 to S. A. Bratt wherein a ring gear of a planetary gear set comprises an axially movable clutch member operable in response to a fluid signal to change the output of drive shaft 16 from a low torque, high speed output to a high torque, slower speed output. The fluid signal to the movable clutch is controlled by an electrically operated valve 21 which is initially set to allow the high speed low torque arrangement and which can be set by an electrical signal to allow the fluid signal to flow through a conduit 23 and provide the slower speed, high torque arrangement. As is most common, motors 14, 14 can be air powered with the flow of motive fluid being controlled by suitable electrically operated control valves 20, 20. It should be understood that motors 14, 14 could also be electric, hydraulic or any combination of pneumatic, hydraulic or electric. The other details of the wrenches are not necessary for a proper understanding of the invention and, accordingly, a more specific description is not provided.

Mounted between the housing of each motor 14 and a rigid frame 22 on which both wrenches 12, 12 are carried, is a suitable transducer or torque cell 24 for developing a signal representative of the instantaneous torque being applied by the fasteners engaged by that wrench. Torque cells 24, 24 can be any of a variety of conventional devices and in the embodiment disclosed herein each comprises a somewhat flexible annular member having strain gauges 25 secured to its outer periphery so that the reaction torque on the wrench is measured and an electrical signal representative of the torque is generated. The reaction torque is, of course, substantially equal to and opposite the torque being applied to fastener. Mounted on each drive shaft 16 for rotation therewith and preferably within associated motor 14, is a suitable encoder 26 that cooperates with a proximity detector 28 for developing signals representative of the incremental angular displacement or rotation of the fastener being tightened. Encoder 26 can be any of the variety of suitable devices and in this embodiment includes a series of teeth 30 formed on its outer periphery. Proximity detectors 28 sense the presence of metal and, thus, the passage of the teeth and develop electrical signals representative of predetermined increments of angular rotation. While examples of torque and rotation measuring devices have been described, it should be understood that any of a variety of devices for accomplishing the noted results can be utilized with the invention.

A control circuit is operatively associated with each wrench 12 for controlling the tightening of a fastener. Each circuit is the same and, accordingly, only one will be described with like reference numerals used for similar parts. At this point it is noted that in the preferred embodiment of the invention disclosed herein, the control circuits are similar to that disclosed in co-pending application, Ser. No. 507,417 filed by John T. Boys on Sept. 19, 1974 for Apparatus For and Method of Determining Rotational or Linear Stiffness which application is a continuation-in-part of Application Ser. No. 357,920 filed on May 7, 1973. The control circuit includes a gradient calculating system that determines the instantaneous gradient or slope of the torque-rotation curve which could be plotted for the particular fastener and joint assembly being tightened and develops an electric signal representative thereof. The gradient calculating system comprises a shift register 32 to which the instantaneous torque signal is fed and whose output is clocked by the rotation signal at fixed increments of angular rotation. Accordingly, the output of shift register 32 is a signal representative of torque a predetermined number of degrees of rotation previous to the instantaneous angle of rotation. A comparator 34 in the form of a suitable subtraction circuit receives the output of shift register 32 and also the signal representative of instantaneous torque and provides an output signal representative of the difference. Since torque signals are subtracted over fixed increments of rotation, the output signal from comparator 34 is representative of the instantaneous gradient of the torque-rotation curve through which the fastener and joint assembly is being tightened.

Figure 2:
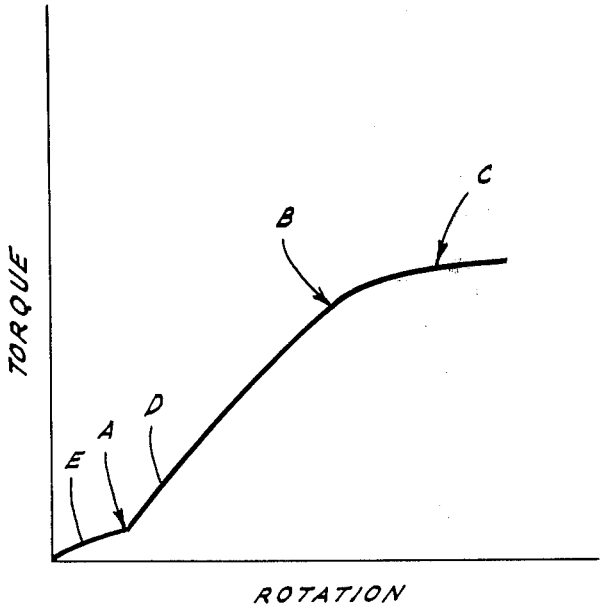
FIG. 2 is a graph illustrating the torque-rotation curve of a fastener which is utilized by the preferred embodiment of the invention for controlling the final condition of the fasteners; and, FIG. 3 is a schematic illustration of a tightening system in accordance with this invention.

At this point, it should be noted, as pointed out in the above referenced application of John T. Boys that a torque-rotation curve for a conventional fastener includes a pretightening region, a tightening region and a yield region, as illustrated in FIG. 2 of the drawing. In the pretightening region, mating threads of the fastener assembly have been engaged and one of the fasteners is being rotated, the bearing face of the rotating fastener has contacted the adjacent face of the structural member included in the joint, but has not completely pulled the joint together. At point A on the curve, the structural members have been completely pulled together by the fasteners, actual tightening of the joint commences and starts the tightening region wherein axial load is induced in the joint. In the art, point A marking the transition between the pretightening and tightening regions is referred to as the snug point and the torque at that point is commonly referred to as the snug torque. In the tightening region of the curve extending from point A to point B, axial force is developed in the fastener and exerted on the structural members as the clamping force and the torque applied to and rotation of the fastener are approximately or generally linearly related. At point B, the limit of proportionality of the joint assembly has been exceeded and the rotation of the fastener member starts increasing at a faster rate than the torque. For purposes of the application, point B will be considered as the start of the yield region, but it will be understood that beyond point B, load will still be induced in the joint assembly but at a non-linear rate of increase. Point C corresponds to the yield point of the joint assembly and while the definition of yield point varies slightly, can be considered to be the point beyond which strain or stretch of the bolt is no longer purely elastic.

While the torque-rotation curve is generally linear from points A to B, it may not be exactly linear and, further, temporary spikes may be included in the curve for any particular fastener or joint assembly which are caused by temporary changes in the coefficient of friction during the tightening cycle. Thus, the output of comparator 34 which would be a signal of constant magnitude if the torque-rotation curve were exactly linear from the noted points may experience certain changes. For this reason the gradient calculating system may include circuits for determining and storing the maximum gradient experienced up to any point along the torque-rotation curve, that is, up to any point in the tightening cycle. In effect, the maximum gradient experienced in the generally linear region of the curve is considered the gradient for that region of the curve.

Accordingly, a storage circuit 36 is provided which stores a signal representative of the maximum gradient and compares instantaneous gradient signals with the maximum, stored signal. If an instantaneous gradient signal is larger than a stored gradient signal, the instantaneous gradient signal is then stored for comparison with instantaneous gradient signals. For a more complete description of storage circuit 36, reference is again made to the co-pending application of John T. Boys.

As also explained in the above-noted co-pending application, when tightening conventional fasteners, the instantaneous torque gradient is related to the maximum torque gradient such that the former is approximately 50% of the latter at the yield point of the fastener or joint assembly. By utilizing a comparator circuit 38 the instantaneous gradient signal from comparator 34 can be compared with the maximum gradient signal from storage circuit 36 and when the former is 50% or less than the latter, comparator circuit 38 can output a detection signal representative of the fastener or joint assembly having been tightened to the yield point. This signal can be fed to control valve 20 to shut off the wrench. When tightening fasteners having other relationships between the instantaneous and maximum gradient, obviously percentages corresponding to these relationships can be utilized in developing the detection signal.

Figure 1:
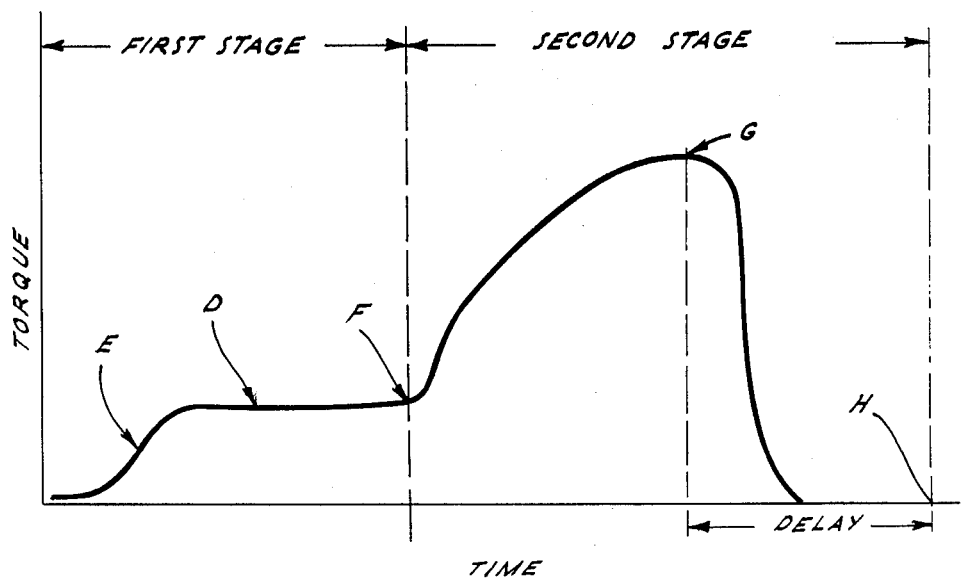
FIG. 1 is a curve illustrating a multi-stage tightening cycle in accordance with this invention.

An interface circuit is provided and is operative to control the operation of wrenches 12, 12 to provide a multi-stage tightening cycle having a torque and time relationship generally as illustrated in FIG. 1 of the drawing.

At this point, it should be remembered that the gear system between motors 14 and drive shafts 16 are arranged so that initially the drive shafts have a high speed, low torque output and it should be noted that the torque output can be arranged to stall the motors at a torque corresponding to the snug torque indicated at point A on the curve in FIG. 2, that is, the torque required to seat the fastener. As each motor stalls, its associated drive shaft 16 no longer rotates although the stall torque is still applied to the fastener through the drive shaft as indicated at point D on the graph of FIG. 1. A NAND gate 40 is connected to receive input signals from proximity probes 28 so that it receives signals from each of the probes as long as its associated encoder is rotating which is indicative, of course, of the rotation of associated drive shaft 16. As each of drive shafts 16 stops rotating, signals from its associated proximity probes 28 are no longer fed to NAND gate 40 and, as is conventional, when NAND gate 40 receives no such signals, it provides an output signal which indicates that all of the wrenches having temporarily discontinued their rotational outputs. The output signal from NAND gate 40 can be utilized to operate control valves 21 allowing a fluid signal to shift from the high speed, low torque gearing to the lower speed, high torque gearing.

While not necessary, it may be desirable for certain uses of the invention to determine that all of the wrenches 12, 12 have functioned to insure that NAND gate 40 is detecting no rotational output of drive shafts 16 because the motors 14, 14 have stalled temporarily discontinuing the rotational output and not because the motors have malfunctioned. Thus, in the preferred embodiment disclosed herein, the signals from torque cells 24, 24 are fed to associated comparators 42, 42 which also receive input signals from preset signal generators 44, 44 which have been set to provide an output signal indicative of a presnug torque, that is a torque less than the snug torque. The setting of signal generators 44, 44 corresponds to a torque indicated at point E on the graph illustrated in FIG. 2. When the actual torque being applied to the fasteners exceeds the presnug torque set into signal generators 44, 44, each of the comparators 42, 42 provides an output signal and these signals are fed to an AND gate 46. As is conventional, when AND gate 46 receives input signals from all of the comparators 42, it provides an output signal indicating that all of the wrenches are operative.

When utilizing the checking system, that is, comparators 42, 42, signal generators 44, 44 and AND gate 46, the signals from NAND gate 40 and AND gate 46 are fed to another AND gate 48 which provides an output signal when it receives both of its input signals as graphically illustrated at point F on the torque-time curve illustrated in FIG. 1. Thus, not only must some torque output be provided by the wrenches, but it must be maintained. The output signal from AND gate 48 is utilized to initiate the second stage of the tightening cycle and could be fed directly to control valves 21, 21 to allow the passage of fluid signal through conduits 23, 23 whereby the gear arrangements between motors 14, 14 and drive shafts 16, 16 are shifted to the slower speed, higher torque output arrangement. When the gear arrangements are shifted wrenches 12, 12 are reactivated and drive shafts 16, 16 again tighten their operatively engaged fasteners.

In accordance with an advantage of the invention disclosed herein, the signal from AND gate 48 can be fed to control valves 21, 21 through a sequence switching apparatus 50 which includes programmable switch means and valve drive amplifiers, the latter providing the signals to control valves 21, 21. The switching means can be any generally conventional type of settable or programmable switches and can be arranged to simultaneously or sequentially control valves 21, 21 so that the fasteners are tightened to the final predetermined condition in any desired programmable manner. In addition, timer circuits 52, 52 are connected to receive control signals from comparators 38, 38 which activate a time-delay of a predetermined length to assure that control valves 20 have shut off wrenches 12 and then provide output signals at the end of the time period which signals are fed to control valves 21, 21 shifting the gear arrangements to the high speed, low torque output arrangements. Accordingly, system 10 is ready for the next tightening cycle.

With particular reference to the graph illustrated in FIG. 1 of the drawing, the operation of the preferred embodiment of the invention disclosed herein will be summarized. When system 10 has been activated, wrenches 12, 12 provide the initial high speed, low torque output to drive shafts 16, 16 and fasteners to be tightened, and at the same time, torque cells 24, 24 provide output signals representative of the torque being applied to the fasteners and proximity detectors 28, 28 also provide incremental output signals representative of the rotation of the drive shafts. At the presnug torque, point E on the graph illustrated in FIGS. 1 and 2, comparator circuits 42, 42 provide output signals to AND gate 46 and when all of the comparators have provided output signals, the AND gate provides an output signal to AND gate 48. Simultaneous with the signals being developed by comparators 42, 42, the wrenches are operative to apply to tighten the fasteners to an initial predetermined condition, that is, the point D on graph illustrated in FIG. 1. Point D is preferably above the snug point A illustrated on the graph of FIG. 2. As each wrench 12 applies the torque at point D to its operationally engaged fastener, motors 14, 14 stall and the output signal of proximity probe 28 associated with the stalled motor provides a signal indicative thereof to NAND gate 40. When all of the motors 14, 14 have stalled, that is, when point F on the graph illustrated in FIG. 1 has been reached and all inputs to NAND gate 40 indicate that all of the motors have stalled, the NAND gate provided an output signal to AND gate 48 allowing the AND gate to provide the output signal through sequence switching apparatus 50 to control valves 21, 21, if it is receiving a signal from AND gate 46. Control valves 21, 21, either simultaneously or sequentially depending on sequence switching apparatus 50, allow the passage of air through conduits 23 shifting the gear arrangements from the low torque, high speed arrangement to the high torque, slower speed arrangement. When the gear arrangements shift, operation of the tightening cycle for each motor now proceeds to the final condition to which the fasteners or joint assembly are to be tightened. Torque signals are fed to shift registers 32, 32 and are clocked by the signals from proximity probes 28, 28 to provide signals representative of a torque measured a predetermined previous increment of rotation to comparators 34, 34 which, as noted previously, also receives instantaneous torque signals from torque cells 24, 24 and provides output signals representative of the instantaneous gradient. Storage circuits 36, 36 determine the maximum gradient for each fastener and provide output signals representative thereof to comparators 38, 38 also receiving output signals from comparators 34, 34. Comparators 38, 38 are operative to determine when the instantaneous and maximum torque gradient signals have a predetermined relationship and provide control signals to control valves 20, 20 shutting off the wrenches at the final predetermied condition point G on the graph illustrated in FIG. 1. For the control system disclosed herein the predetermined condition is the yield point of the fastener or joint assembly and, thus point G on the graph corresponds to point C on the graph illustrated in FIG. 2 of the drawing. The control signal from comparators 38, 38 are also operative as noted previously to activate timer circuits 52, 52 and eventually close valves 21, 21 allowing the gearing arrangements to shift from the high torque, slower speed to the low torque high speed arrangement as shown at point H on the graph illustrated in FIG. 1.

In view of the foregoing, it can be seen that a multi-stage tightening system has been provided which will assure that all of the wrenches have temporarily discontinued an output at a predetermined point in the tightening cycle and which, thereafter, reactivates the wrenches for tightening the fasteners until the final predetermined condition. Moreover, it can be seen that the system can easily be arranged to include a checking arrangement determining that all of the wrenches are in fact operative before shifting from the first to the second stage in the tightening cycle. It should also be realized of course that the interface circuit can be utilized with various control systems controlling the final condition of the joint, for example torque controlled systems, torque-turn control systems, torque-time systems or other systems operative to control the final condition of a fastener.

While in the foregoing, there has been described a preferred embodiment of a tightening system in accordance with this invention, it should be understood that various modifications can be made without departing from the true spirit and scope of the invention as set out in the appended claims.

We claim:

1. A multi-stage tightening system including a plurality of wrenches each adapted to tighten a fastener, means for discontinuing the output of each of said wrenches at an initial predetermined condition, control means operatively associated with each of said wrenches for shutting off said wrenches at a final predetermined condition, and interface means operatively associated with said control means for determining when all of said wrenches have discontinued their output, including checking means for determining if all of said wrenches have provided an output, and for thereafter reactivating said wrenches if each of said wrenches maintains some minimum output, whereby said control means can shut off said wrenches at said final predetermined condition.

2. A multi-stage tightening system in accordance with claim 1 wherein said interface means includes detection means responsive to signals representative of the rotational output of said wrenches whereby said detection means provides an output when it receives no signals representative of said rotational output.

3. A multi-stage tightening system in accordance with claim 1 wherein said means for discontinuing the output of said wrenches includes a low torque gear system in each of said wrenches adapted to stall at said initial predetermined condition.

4. A multi-stage tightening system in accordance with claim 3 wherein said interface means provides an output signal when all of said wrenches have discontinued their output, said signal being operative to shift from said low torque gear system to a high torque gear system whereby said wrenches are reactivated.

5. A multi-stage tightening system in accordance with claim 1 wherein said checking means includes means responsive to an initial output from said wrenches and for providing a signal representative thereof.

6. A multi-stage tightening system in accordance with claim 2 wherein said checking means provides an output signal indicating that all of said wrenches have provided an output, said output signal being required to enable said detection means to provide an output.

7. A multi-stage tightening system in accordance with claim 3 wherein said checking means is responsive to a prestall torque output of said wrenches for enabling said interface means to reactivate said wrenches only if said prestall torque is maintained whereby malfunction of said wrenches before all of said wrenches have discontinued their outputs will not allow said system to be reactivated.

8. A multi-stage tightening system in accordance with claim 1 wherein said wrenches are reactivated simultaneously.

9. A multi-stage tightening system in accordance with claim 1 wherein said wrenches are reactivated sequentially.

10. A multi-stage tightening system in accordance with claim 1 wherein said control means comprise means for shutting off said wrenches when said fasteners have been tightened to their yield point.

11. A multi-stage tightening system including a plurality of wrenches each adapted to tighten an individual fastener, means operatively associated with said wrenches for discontinuing the rotational output of said wrenches at a predetermined seated condition of said fasteners, control means operatively associated with each of said wrenches for determining the yield point of the fastener being tightened by its associated wrench and for shutting off said wrench, interface means operatively associated with all of said control means for determining when all of said wrenches have discontinued their rotational output and for reactivating said wrenches whereby said control means can shut off said wrenches.

12. A multi-stage tightening system in accordance with claim 11 wherein said control means develops signals representative of the rotational outputs of said wrenches and wherein said interface means determines when all of said signals indicate that all of said rotational outputs have been discontinued.

13. A multi-stage tightening system in accordance with claim 11 wherein said interface means includes checking means for determining that all of said wrenches are operative before said fasteners have been seated.

14. A multi-stage tightening system in accordance with claim 13 wherein said checking means includes means for determining that all of said wrenches have provided a torque output before said fasteners are seated and that each of said wrenches maintain said torque output.

15. A multi-stage tightening system comprising a plurality of wrenches each adapted to tighten an individual fastener in an individual joint assembly, means operatively associated with said wrenches for discontinuing the rotational output thereof at a predetermined seated condition of said fasteners in said joint assemblies, control means operatively associated with each of said wrenches for determining the yield point of each said joint assembly as measured by the fastener being tightened by its associated wrench and for shutting off said wrench, and interface means operatively associated with all of said control means for determining when all of said wrenches have discontinued their rotational output and for reactivating said wrenches, whereby said control means can shut off said wrenches.

16. A multi-stage tightening system in accordance with claim 15 wherein said control means develops signals representative of the rotational outputs of said wrenches and wherein said interface means determines when all of said control means signals indicate that all of said rotational outputs have been discontinued.

17. A multi-stage tightening system in accordance with claim 15 wherein said interface means includes checking means for determining that all of said wrenches are operative before said fasteners have been seated.

18. A multi-stage tightening sytem in accordance with claim 17 wherein said checking means includes means for determining that all of said wrenches have provided a torque output before said fasteners are seated and that each of said wrenches maintain said torque output.

19. A multi-stage tightening system in accordance with claim 15 wherein said means for discontinuing the rotational output of said wrenches includes a low torque gear system in each of said wrenches adapted to stall at said predetermined seated condition of said fasteners in said joint assemblies.

20. A multi-stage tightening system in accordance with claim 19 wherein said interface means provides an output signal when all of said wrenches have discontinued their output, said signal being operative to shift from said low torque gear system to a high torque gear system whereby said wrenches are reactivated.

21. A multi-stage tightening system in accordance with claim 17 wherein said checking means includes means responsive to an initial output from said wrenches and for providing a signal representative thereof.

22. A multi-stage tightening system in accordance with claim 16 wherein said interface means includes checking means for determining if all of said wrenches have provided an output and for providing an output signal indicating that all of said wrenches have provided an output, said checking means output signal being required to enable said interface means to provide a signal when all of said control means signals indicate that all of said rotational outputs of said wrenches have been discontinued.

23. A multi-stage tightening system in accordance with claim 19 including checking means responsive to a pre-stall torque output of said wrenches for enabling said interface means to reactivate said wrenches only if said pre-stall torque is maintained, whereby malfunction of said wrenches before all of said wrenches have discontinued their outputs will not allow said system to be reactivated.

24. A multi-stage tightening system in accordance with claim 15 wherein said wrenches are reactivated simultaneously.

25. A multi-stage tightening system in accordance with claim 15 wherein said wrenches are reactivated sequentially.

* * * * *